US006508993B1

(12) United States Patent
Schaefer et al.

(10) Patent No.: US 6,508,993 B1
(45) Date of Patent: *Jan. 21, 2003

(54) METHOD FOR DISSOLVING BASE METALS AND NOBEL METALS FROM ORES CONTAINING THEM

(75) Inventors: Dieter Schaefer, Muenzenberg (DE); Matthias Grehl, Frankfurt (DE); Horst Meyer, Altenstadt (DE)

(73) Assignee: W.C. Heraeus GmbH & Co. KG, Hanau (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/595,033

(22) Filed: Jun. 16, 2000

(30) Foreign Application Priority Data

Jun. 18, 1999 (DE) .......................... 199 27 784

(51) Int. Cl.$^7$ .............................................. C22B 11/00
(52) U.S. Cl. ............................ 423/22; 423/39; 423/53; 423/150.1
(58) Field of Search ............................ 423/22, 27, 38, 423/46, 39, 53, 150.1; 75/743, 744

(56) References Cited

U.S. PATENT DOCUMENTS

| 709,037 A | * | 9/1902 | Pethybridge | 423/38 |
| 846,768 A | * | 3/1907 | Worsey et al. | |
| 1,041,407 A | * | 10/1912 | De Alzugaray | 423/38 |
| 2,283,198 A | | 5/1942 | Fink et al. | 75/102 |
| 4,666,514 A | | 5/1987 | Bertha | 75/118 |
| 4,874,429 A | | 10/1989 | Bertha | 75/118 |

FOREIGN PATENT DOCUMENTS

| GB | 1517270 | * | 7/1978 |

OTHER PUBLICATIONS

English–language abstract of CN 1123843A, dated Feb. 14, 2000.
English–language abstract of CN 1119678A, dated Feb. 14, 2000.
English–language abstract of CN 1114361A, dated Feb. 14, 2000.
English–language abstract of JP 0060136465AA, published May 17, 1994.
English–language abstract of JP 0030199126AA, published Aug. 30, 1991.
English–language abstract of JP 0020197532AA, published Aug. 6, 1990.
English–language abstract of JP 0580194745AA, published Nov. 12, 1983.

\* cited by examiner

*Primary Examiner*—Steven Bos
(74) *Attorney, Agent, or Firm*—Norris McLaughlin & Marcus

(57) ABSTRACT

A method for dissolving base metals and noble metals from ores having base metals and noble metals which comprises adding the ore to a solution of a non-acid oxidizing agent, then adding an aqueous solution of an acid forming halide and then adjusting the H$^+$ concentration of the combined solutions to a minimum H$^+$ concentration of 1 mol/l.

7 Claims, No Drawings

METHOD FOR DISSOLVING BASE METALS AND NOBEL METALS FROM ORES CONTAINING THEM

The invention relates to a method for dissolving ores which contain base metals that would, if contacted with a hydrohalic acid evolve hydrogen, and noble metals in either metallic or alloyed form, or both.

It has long been known to treat ores which contain base metals as well as noble metals by first dissolving the base metals with hydrochloric acid, and then dissolving the noble metals in a solution of hydrochloric acid and chlorate. A disadvantage of this method is that hydrogen is released, which has a high potential for deflagration and endangerment.

Furthermore, it is known to dissolve such ores with aqua regia. In this case too large amounts of hydrogen are released, with the disadvantages referred to above, and nitrogen oxides are also formed, which is a concern with respect to environmental contamination, and energy-intensive concentrations of hydrochloric acid are required for a subsequent operation to remove nitrates.

On this account the problem arises of at least partially remedying the above-mentioned disadvantages by means of a novel process. The problem lies especially in developing a process for dissolving such ores which produces little exhaust contamination, no evolution of hydrogen, and eliminates the need for hydrochloric acid concentration.

This problem is solved according to the invention by a method wherein an ore containing base metals which, if contacted with hydrochloric acid, would result in the release of hydrogen, and also containing noble metals in metallic form, alloyed form or both, is placed in a solution of a non-acid oxidizer containing halide ions, and having a halide concentration of at least 1 mol/l, at a temperature of 70° C. to 90° C. In this case the oxidizer, which contains halogen, will, when brought into contact with hydrohalic acid form elemental halogen, such as chlorine gas for example. Then acid forming halide ions in aqueous solution is added, dissolving the metal components. The addition of acid is performed such that no hydrogen forms, and thus it is adapted to the rate of the reaction.

The solution that is formed is then adjusted by the addition of hydrohalic acid to a minimum $H^+$ concentration of 1 mol per liter. In this manner the oxidizer breaks down with the release of elemental halogen, especially a halogen gas.

It is especially advantageous if chlorate, bromate or hypochlorite is used as the oxidizer, since, with these oxidizing agents a rapid dissolution of the metal compounds takes place and the added $H^+$ ions are buffered away at a satisfactory rate.

Preferred oxidizers are sodium chlorate, potassium chlorate, sodium bromate, potassium bromate, sodium hypochlorite and potassium hypochlorite.

The ore is advantageously put into a 4.5 molar solution of the oxidizer, since the addition of the solution for one thing prevents any uncontrolled deflagration by having a high heat removal ability and for another thing the volume added thereto does not disproportionately increase size of the reaction mixture due to the high salt concentration.

In practice it has proven particularly advantageous if the oxidizer solution is maintained at a temperature of 80° C., since at this temperature the speed of the reaction is high enough to capture the $H^+$ ions (preventing the formation of hydrogen gas) and dissolve the metals; while on the other hand the solubility of the chlorine gas that forms is still sufficient to keep it in solution.

Also, solid sodium chloride is advantageously added to the oxidizing solution so as to provide a sufficient concentration of chloride ion throughout the entire process to minimize the danger of a hazardous formation of chlorine dioxide. The only oxidation product that forms, in addition to the actual metal ion compounds, is a chlorohalogen, especially chlorine gas.

The following example will serve to explain the invention:

Materials Used
  Chips of an alloy Pt/Cr/Co
  Hydrochloric acid, concentrated, technical
  Sodium chloride, technical
  Sodium chlorate solution, 4.5 mol/l Conduct of the Experiment, and Remarks 196.9 g of a Pt/Cr/Co alloy were available in the form of chips. 296 liters of 4.5 molar sodium chlorate solution was placed together with 700 liters of tap water and 150 kg of solid sodium chloride into a double-jacketed vat. The mixture was heated with steam to a temperature of 80° C., with stirring.

In the meantime a plastic basket was loaded with about 50 kg of the Pt/Cr/Co chips and hung in the reactor so that the basket was immersed in the solution and the chips were in contact with the solution. When the dissolving temperature was reached, hydrochloric acid began to be fed into the solution at a rate of about 0.6 l/min. The flow of the hydrochloric acid was limited by a perforated disk for safety reasons.

The chips were worn away during the dissolving process. Fresh material was added to the dissolved chips during the dissolving process. After a reaction time of about 20 h the complete material was loaded into the basket and about 750 liters of hydrochloric acid was fed in. During the dissolving process a sample was taken from the solution at regular intervals with a dipper and held under the outlet of the hydrochloric acid. A decided foaming of the solution by the forming chlorine gas indicated that sufficient sodium chlorate was still available for the dissolving process. After the dissolving period the basket was removed from the reactor and was filled to about ⅓ of its capacity with black, sludge-like dissolution residue; the residue was scooped out of the basket into the vat and 20 liters of sodium chlorate solution was again added. Then over a period of 2 hours hydrochloric acid was slowly added in order to dissolve the remaining chips. The product solution was a dark brown to reddish color.

Then additional hydrochloric acid was added to initiate the destruction of the chlorate. During this procedure, first chlorine gas definitely evolved out of the solution up to a point where the most of the sodium chlorate had been destroyed. The pH of the solution decreased, which was accompanied by a visible color change from brownish red to dark green. Beginning at this point the development of chlorine gas simultaneously decreased, so that the rate of addition of the acid could be increased slowly and step-by-step.

In all, 500 liters of hydrochloric acid was added over a period of 2 hours to destroy the chlorate. Thereafter the temperature of the solution was increased to 90° C. in order to drive the excess chlorine gas out of the solution. After two hours at 90° C. no further chlorine gas emission was to be observed, so that the steam heating could be shut off and the solution cooled to 60° C. Then 20 liters of settling agent was added, the contents of the reactor mixed thoroughly, the stirrer was turned off and the solution was left to settle overnight. The main part of the solution was siphoned off and the residue filtered through a suction filter. The residue was washed on the suction filter and the wash water was combined with the processing solution. 34.7 kg of moist solution residue was obtained. The product solution with a volume of 2200 liters was found by titration to be 1.5 [n] N in HCl. This acid normality assures that the sodium chlorate was completely destroyed.

During the process it was assured at all times by the chosen process method by feeding the hydrochloric acid at a rate adapted to the rate of reaction that no outgassing of hydrogen can take place. If the addition of the acid is interrupted, it is used up by the sodium chlorate and thus is no longer available for the formation of hydrogen gas.

What is claimed is:

1. Method for dissolving ores bearing base metals which develop hydrogen in contact with hydrohalic acid, and noble metals in metallic form, alloyed form or both, which comprises
   a) forming a first solution of a non-acid oxidizing agent containing halide ions, with a minimum halide concentration in the solution of 1 mol/l and adding said ore to said first solution at a solution temperature of from 70° C. to 90° C.,
   b) adding an aqueous second solution of acid to said first solution to form halide ions and dissolve the metal components of said ore, said second solution being added at a rate sufficient to prevent outgassing of hydrogen, and then
   c) adding a hydrohalic acid to adjust the $H^+$ concentration of the solution formed by the addition of the second solution to the first solution to an $H^+$ concentration of at least 1 mol/l.

2. Method according to claim 1, wherein said oxidizing agent is a chlorate, bromate or hypochlorite.

3. Method according to claim 2, wherein said oxidizing agent is sodium chlorate, potassium chlorate, sodium bromate, potassium bromate, sodium hypochlorite or potassium hypochlorite.

4. Method according to claim 1, wherein said solution of non-acid oxidizing agent is a 4.5 molar sodium chlorate solution.

5. Method according to claim 1, wherein said temperature of said first solution is 80° C.

6. Method according to claim 1, wherein solid sodium chloride is added to said first solution.

7. Method according to claim 1, wherein said aqueous second solution of acid forming halide ions is a concentrated hydrochloric acid solution.

* * * * *